(12) United States Patent
Jendzurski et al.

(10) Patent No.: US 6,626,633 B2
(45) Date of Patent: Sep. 30, 2003

(54) APPARATUS FOR FEEDING A PANEL FROM A STACK

(75) Inventors: Robert J. Jendzurski, Lancaster, PA (US); Todd R. Hassel, Mobile, AL (US); Karl B. Himmelberger, Millersville, PA (US)

(73) Assignee: AWI Licensing Company, Wilmington, DE (US)

( * ) Notice: Subject to any disclaimer, the term of this patent is extended or adjusted under 35 U.S.C. 154(b) by 0 days.

(21) Appl. No.: 10/035,648

(22) Filed: Dec. 28, 2001

(65) Prior Publication Data

US 2003/0123969 A1 Jul. 3, 2003

(Under 37 CFR 1.47)

(51) Int. Cl.[7] .............................................. B65G 59/06
(52) U.S. Cl. ................................. 414/797.9; 414/797.5
(58) Field of Search ........................... 414/797.9, 797.6, 414/797.7, 797.5

(56) References Cited

U.S. PATENT DOCUMENTS

| | | | | |
|---|---|---|---|---|
| 3,506,258 A | * | 4/1970 | Lindquist | 271/119 |
| 4,396,336 A | * | 8/1983 | Malamood | 414/796.1 |
| 4,462,738 A | * | 7/1984 | Walters et al. | 414/797.5 |
| 4,702,660 A | * | 10/1987 | Niehaus et al. | 414/795.2 |
| 5,772,392 A | * | 6/1998 | Okura et al. | 414/797.9 |
| 5,938,073 A | * | 8/1999 | Chang | 221/259 |

FOREIGN PATENT DOCUMENTS

| | | | | |
|---|---|---|---|---|
| JP | 63-208431 | * | 8/1988 | 414/797.5 |
| JP | 04-327426 | * | 11/1992 | 414/797.5 |
| JP | 06-144578 | * | 5/1994 | 414/797.5 |

* cited by examiner

Primary Examiner—Janice L. Krizek
Assistant Examiner—Michael J. Kwon
(74) Attorney, Agent, or Firm—Womble Carlyle Sandridge & Rice, PLLC

(57) ABSTRACT

Disclosed are both a method and apparatus for preventing facial defects from occurring to the face of a panel as it is removed from a stack of similar panels. The apparatus includes at least two synchronized cams working together to lift a stack of panels as the bottom most panel is removed from the stack. In supporting the stack of panels as the bottom panel is freed, the bottom panel can be slid out from under a stack without damaging the facing of the panel.

10 Claims, 6 Drawing Sheets

APPARATUS FOR FEEDING A PANEL FROM A STACK

FIELD OF INVENTION

The present invention relates generally to a method and apparatus for feeding a panel from a stack of panels and more particularly to feeding a panel from a stack without damaging the face of the panel.

BACKGROUND

In the highly automated manufacture of panels and specifically ceiling panels, the panels often are damaged during the manufacturing process. Generally, there is a point in the process when the panels are stacked into a hopper. As panels are removed individually from the bottom of the stack, they may become marred. As the bottom panel is removed from the stack, the facing of this panel is dragged across the backing side of the panels stacked above it. This dragging often leads to the scratching and marring of the facing side of the removed panel.

Various methods have been devised to help alleviate the marring and facial defects occurring to the panels as they are removed from the stack. One such method uses drop feeders that release the bottom panel from the stack and then place the panel on a transport chain just prior to the engaging of the panel by pushers that move the panel along. Unfortunately, the number of panels that can be processed in a given period by this method is rather limited. Other methods include hand feeding the individual panels for processing, but the number of panels that can be processed by this method is also quite limited.

A further method used to limit facial defects in panels as they are being processed is to operate in a "one-in/one-out" mode. This method essentially eliminates the need to stack the panels in a hopper. Unfortunately, this method requires the use of expensive servo drives, chain speed sensors, panel position sensors, transport chain pusher sensors and complex logic to keep track of the position of each panel relative to the pusher.

Thus, a method for delivering panels with fewer facial defects is needed. A method and apparatus is needed that can economically deliver panels one at a time from a hopper, at acceptable production rates, without the panels experiencing a significant incidence of facial defects during this process step.

SUMMARY

The present invention comprises both a method and apparatus for reducing the incidence of facial defects to the face of a panel as it is removed from a stack of panels. The apparatus provides a pair of synchronized cams working together to engage a stack of panels as the bottom most panel is being removed from the stack. By engaging the stack of panels with the cams, the bottom most panel can be removed with less likelihood of marring its facing.

In greater detail, the invention comprises an apparatus for feeding a first panel from a stack of panels residing above the first panel. The apparatus includes a pusher for engaging and feeding the first panel from the stack. Additionally, a first cam having a first major lobe and a first minor lobe is provided. The profile of the first cam is such that the angle of the arc of the major lobe is greater than the angle of the arc of the minor lobe. The first major lobe engages the trailing edge portion of the stack residing above the first panel and lifts the stack residing above the first panel as the pusher moves the trailing edge of the first panel out from under the stack at a first position. A second cam also having a major lobe and a minor lobe is provided to help support the stack of panels. The difference between the first cam and the second cam is that the profile of the second cam is such that the angle of the arc of the major lobe is less than the angle of the arc of the minor lobe. The stack of panels is supported and lifted as the major lobe of the second cam engages the leading edge portion of the stack of panels as the first panel is pushed out from under the stack at a second position.

Furthermore, after the first panel is moved out from under the stack, the stack of panels is lowered and the process begins again when the minor lobes of the cams or the transition zones engaging the stack of panels. The cams are mechanically linked to the tenoner transport chains to provide proper timing of the lifting and lowering of the stack relative to the position of the pusher. Also, the major lobe of the first cam has a greater angular profile than the major lobe of the second cam so as to provide a longer support or lifting cycle. The first and second cam shafts are mechanically linked to synchronize the action.

Additionally, a method for delivering a panel is provided including the steps of pushing a first panel from a stack of panels residing above the first panel. The stack of panels has both a trailing edge and a leading edge. Then the trailing edge of the stack residing above the first panel is supported as the first panel trailing edge is pushed out from under the trailing edge portion of the stack at a first position. Next, as the panel is pushed along, the leading edge portion of the stack is further supported as the trailing edge of the first panel is pushed out from under the leading edge portion of the stack at a second position. The panel is then removed from the stack and the process can begin again.

DETAILED DESCRIPTION

The present invention, as shown in FIGS. 1–5, comprises an apparatus 10 for reducing the likelihood that the face of a ceiling panel is marred as it is removed from a stack of similar panels. The apparatus provides a pair of synchronized cams working together to lift a portion of a stack of panels as the bottom most panel is being removed from the stack. By supporting the stack of panels as the bottom panel is removed therefrom, the bottom panel can be slid out from under a stack with less chance of damaging the facing of the panel then would arise if the stack was not supported.

Figure 1:
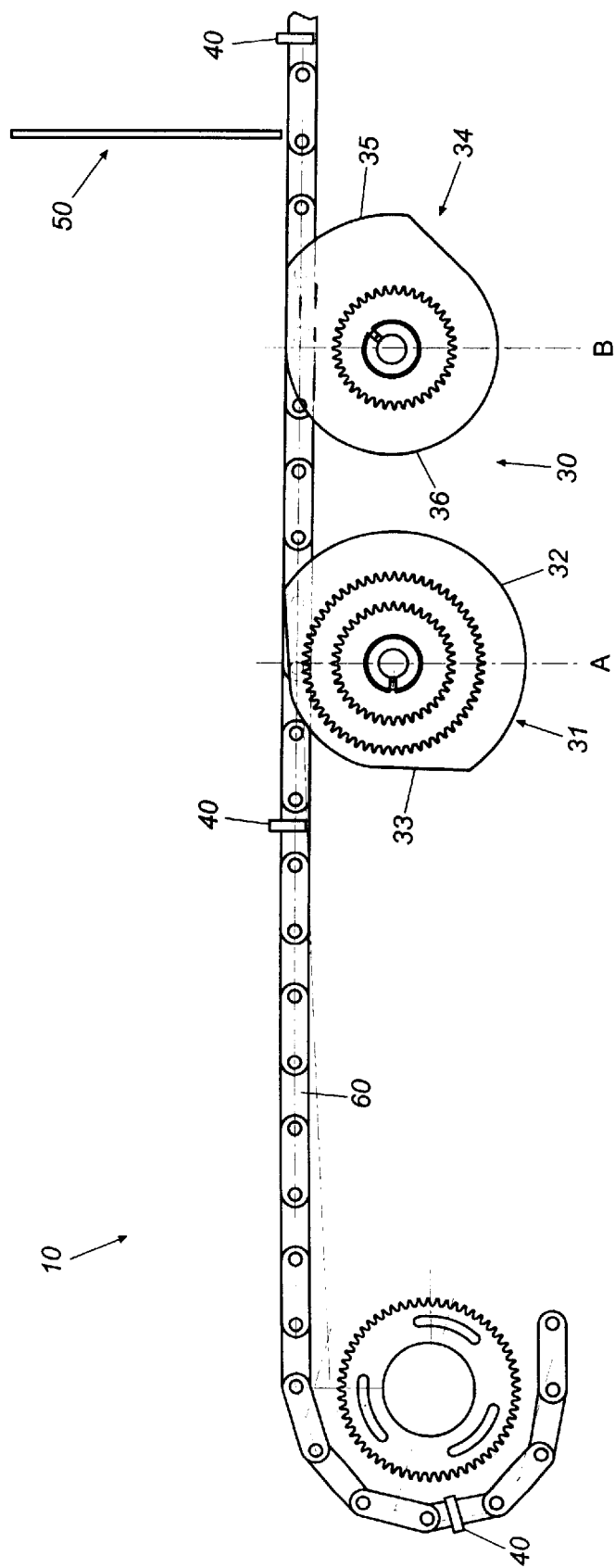
FIG. 1 is a side elevation view of a section of an apparatus for processing panels embodying aspects of the present invention with portions removed.
Figure 5:
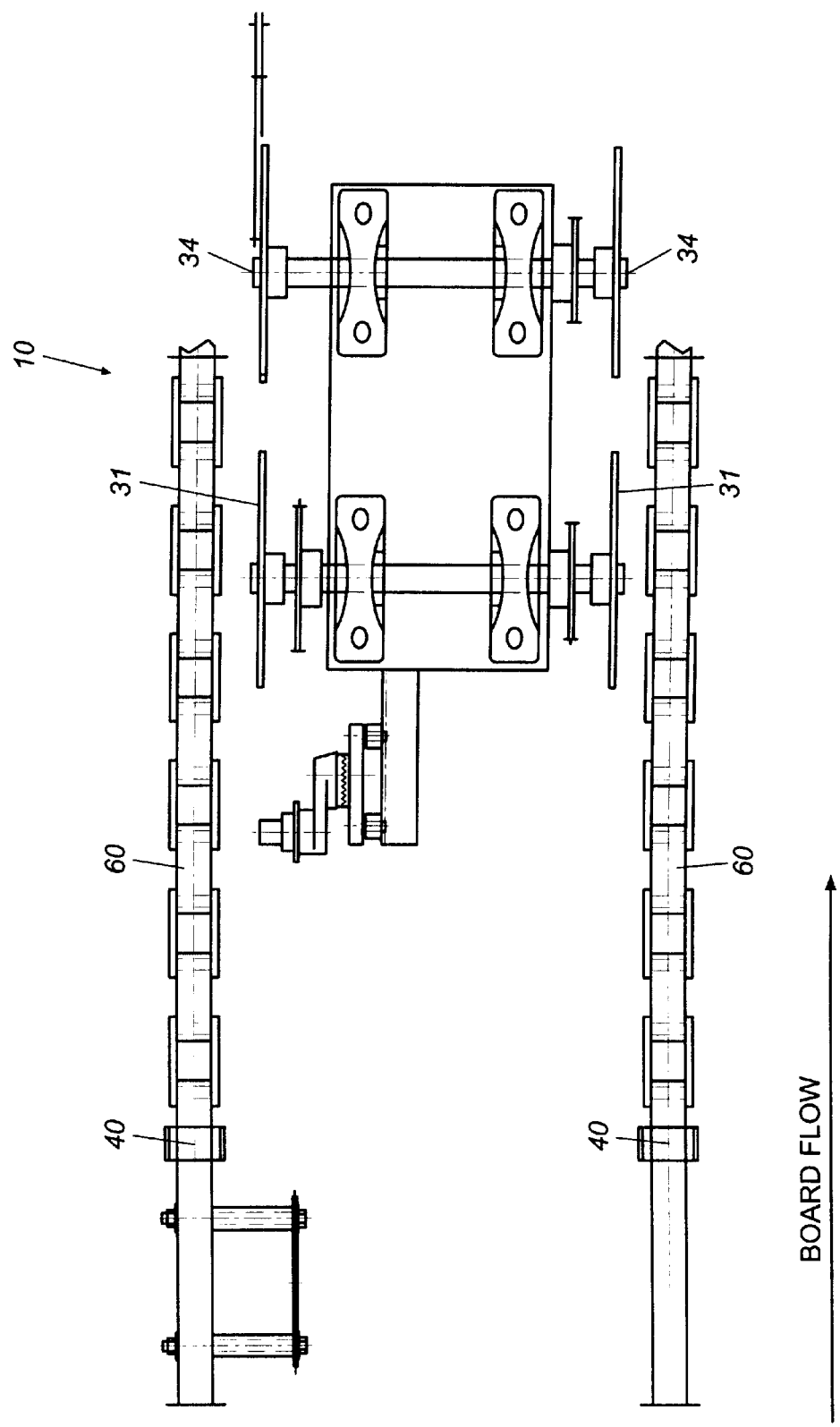
FIG. 5 is a top view of the section of apparatus embodying principles of the present invention.

FIGS. 1 and 5 show two different views of a section of the apparatus 10 of the present apparatus for feeding panels. Some sections of the apparatus have been removed for clarity. The apparatus generally includes a pair of tenoner chains 60 to which are attached pushers 40 that are spaced at appropriate intervals. The tenoner chains 60 run below a hopper 50 into which panels are stacked during the manufacture of the panels. Situated generally below the hopper, although other arrangements are also contemplated, are cams 31 and 34. While the embodiment of the apparatus 10 is shown in FIG. 5 with the first cams 31 and two second cams 34, the present invention encompasses other configurations in which the number of first and second cams 31 and 34 vary.

The tenoner chains 60 and cams 31 and 34 are operably connected in order to rotate in synchronicity. The operable connection may be made by a series of gears, timing chains and the like (not shown). The tenoner chains 60 and cams 31 and 34 are powered by a drive motor or similar device (not shown).

Figure 2A:
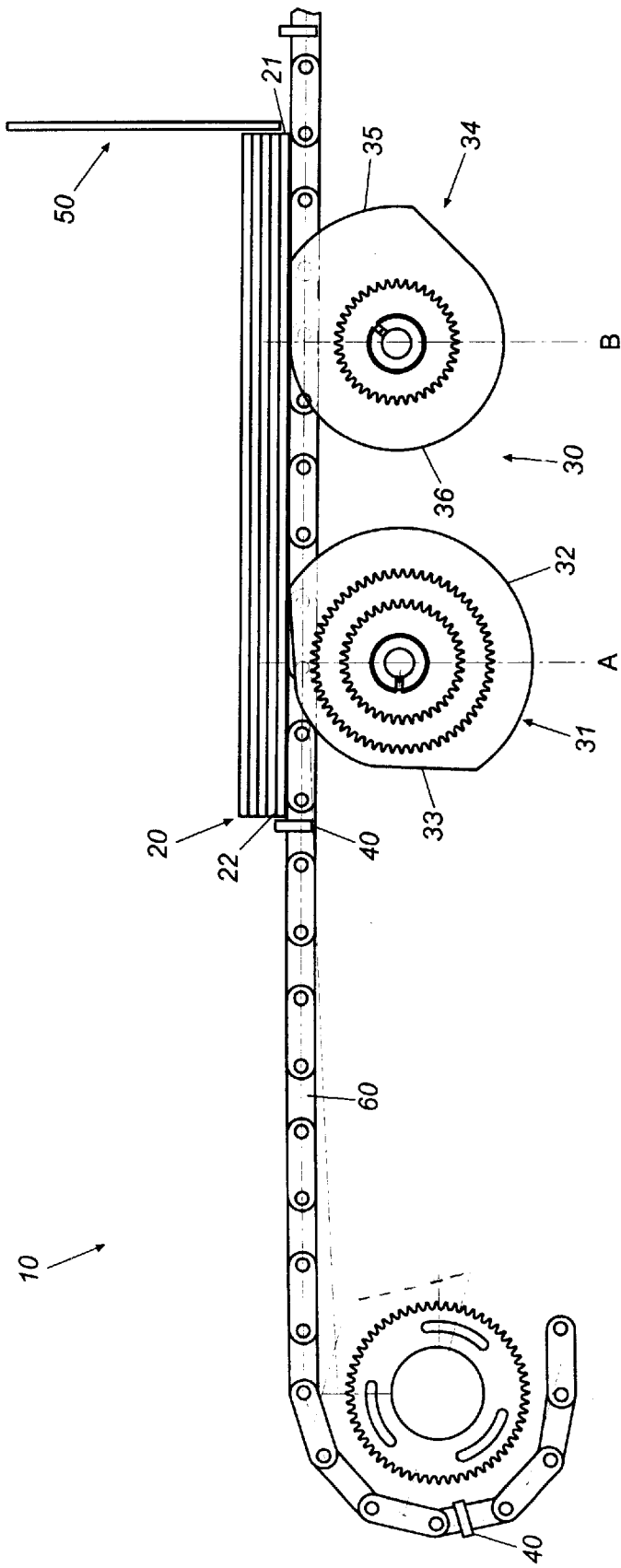
FIG. 2a is a side elevation view of a section of an apparatus for processing panels as shown in FIG. 1 having a stack of panels positioned at the beginning of a cycle embodying aspects of the present invention with portions removed.
Figure 2B:
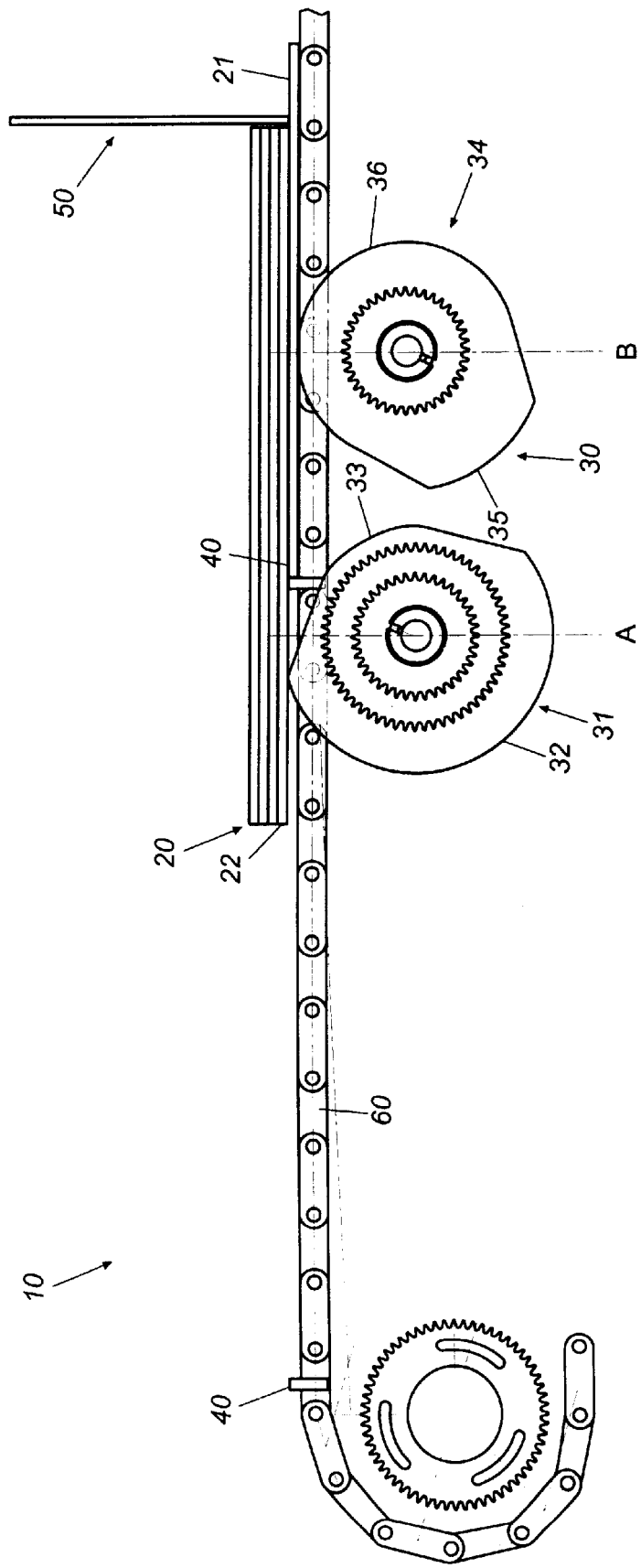
FIG. 2b is a side elevation view of the section of the apparatus of FIG. 2a with the panels and apparatus in a further progression.
Figure 2C:
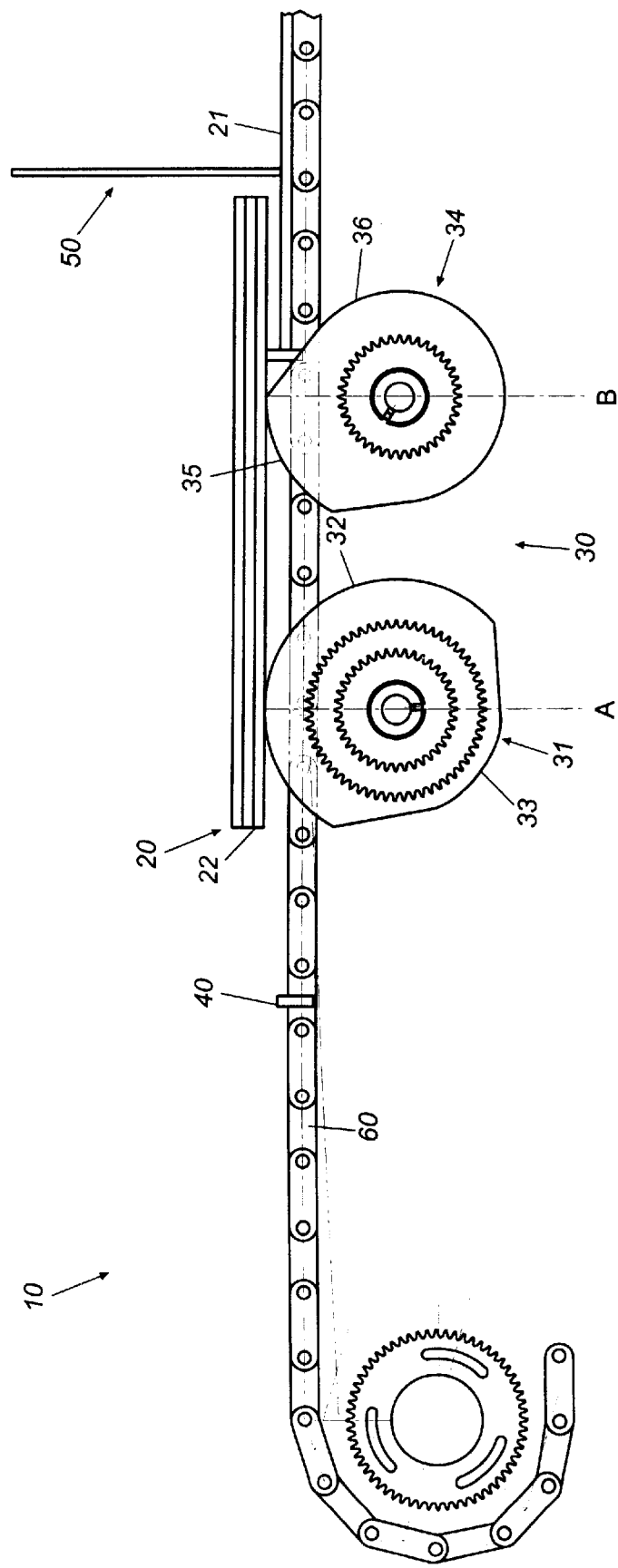
FIG. 2c is a side elevation view of the section of the apparatus of FIG. 2a with the panels and apparatus in a further progression.

In greater detail, as shown in FIGS. 2a–2c, the stack of panels 20 is lifted using a cam system 30 while the first or bottom panel 21 is removed using spaced pushers 40. This process is designed to occur under steady state operating conditions with the panels being conveyed to a hopper 50 and stacked between four or five panels high. The panels have decorative images on one side of the panel and are stacked image side up in the hopper 50. The panels are removed from the hopper on a first-in/first-out basis. Evenly spaced pushers 40 attached to a pair of transport chains 60 remove the panel 21 from the bottom of the stack 20. The pushers 40 engage one edge of the bottom panel 21 and slide the panel 21 out from under the stack 20. To prevent the bottom panel 21 from being scratched when it is slid out from under this stack 20, the present invention raises the remaining panels using the cams 30. The panel stack 20 is raised above the panel 21 being slid out from under the stack 20.

The cams 30 which raise the remaining panels each comprise a major lobe and a minor lobe to provide lift at certain intervals in a synchronized manner. The major lobes engage the underside of the panel just above the bottom panel just as the bottom panel begins to slide out from under the stack. As the bottom most panel 21 is slid past the halfway point A of the first cam 31, the first cam 31 then engages and lifts the panel 22 residing directly above the bottom most panel 21 being slid out from under the stack 20. When the bottom most panel 21 slides past the halfway point B of the second cam 34, the second cam 34 also engages and lifts the panel 22 residing directly above the bottom most panel 21. The duration of the lift is designed to keep the stack 20 elevated until the bottom panel 21 clears the remaining panels in the stack 20. The cam profiles then lower the stack 20 and the process repeats itself.

Figure 3:
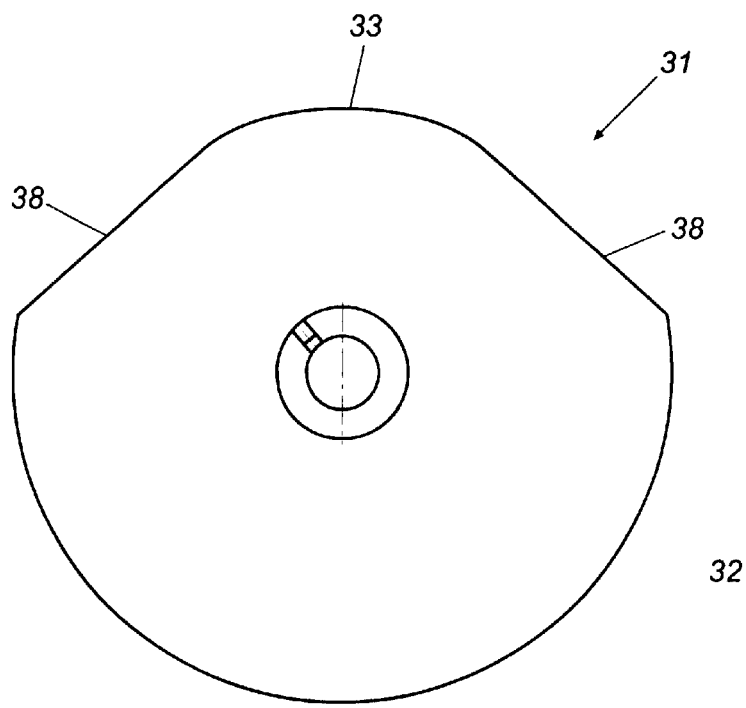
FIG. 3 is a side elevation view of a first cam embodying principles of the present invention.

The first cam 31 includes a first major lobe 32 and first minor lobe 33. Likewise the second cam 34 includes a second major lobe 35 and a second minor lobe 36. Each major lobe has a radius that is greater than the minor lobe on the same cam. In the embodiment of the apparatus shown in FIGS. 2a–2c, the minor lobes 33 and 36 on cams 31 and 34, respectively, are equal in radius. However, it is contemplated that the major lobes of the first and second cams may differ in radius. The first major lobe 32 of the first cam 31 can comprise between about 180° and about 220° of an angular profile of the circumference of the first cam as illustrated in FIG. 3. The first minor lobe 33 of the first cam 31 can comprise between about 60° and about 100° of an angular profile of the circumference of the first cam 31 as illustrated in FIG. 3.

Figure 4:
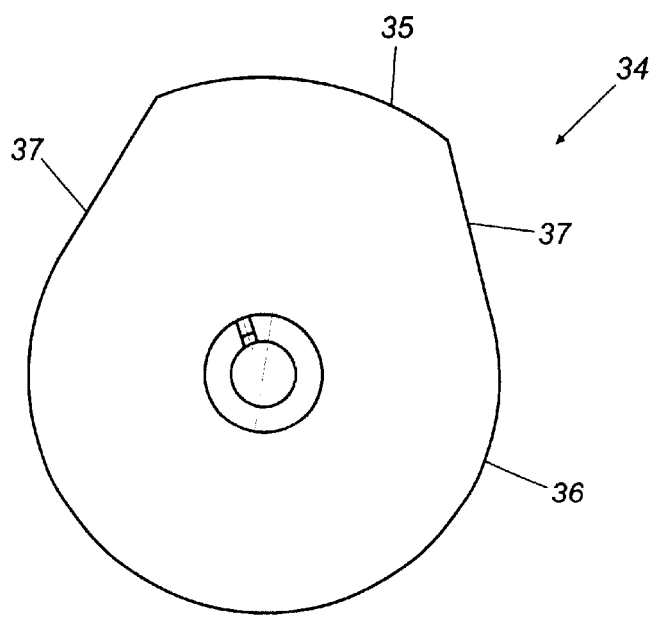
FIG. 4 is a side elevation view of a second cam embodying principles of the present invention.

The second cam 34 also has both a second major lobe 35 and a second minor 36 lobe. The second major lobe 35 of the second cam 34 can comprise between about 40° and about 80° of an angular profile of the circumference of the second cam 34 as illustrated in FIG. 4. The second minor lobe 36 of the second cam 34 can comprise between about 200° and about 240° of an angular profile of the circumference of the second cam 34 as illustrated in FIG. 4.

Furthermore, the first and second cams 31 and 34 may have transition zones 37 and 38 placed between the minor and major lobes of the cams. The first cam 31 has transition zones 38 and the second cam 34 has transition zones 37. The transition zones 37 and 38 gradually transition the cam profile from the two lobes. An example angular profile for the transition zones 37 and 38 of either the first or second cams 31 and 34 can range between about 25° and about 45° of the circumference of the cams 31 and 34.

The first and second cams 31 and 34 may be spaced apart at an interval between about 10 to 14 inches. The cams 31 and 34 may be spaced at other intervals depending upon the length of panels being distributed. The cam spacing may be greater if the panels are larger than standard acoustical panels or they may be spaced closer if the panels are smaller. Other criteria may also require different spacing of the cams. Furthermore, if the cams are spaced at intervals greater than about 10 to 14 inches, then the angle for the major lobe 32 of the first cam 31 would be increased and the angle for the major lobe 35 of the second cam 34 would be decreased. The opposite would be true for intervals spaced at distances of less than about 10 to about 14 inches.

While certain embodiments have been illustrated and described above, it is recognized that variations may be made with respect to disclosed embodiments. Therefore, while the invention has been disclosed in various forms only, it will be obvious to those skilled in the art that many additions, deletions and modifications can be made without departing from the spirit and scope of this invention, and no undue limits should be imposed except as set forth in the following claims.

What is claimed is:

1. An apparatus for feeding a first panel having a trailing edge from a stack of panels residing above the first panel, the stack of panels having a leading edge portion and a trailing edge portion, the apparatus comprising:

a pusher engaging the first panel trailing edge;

a first cam having a first major lobe and a first minor lobe, wherein the first major lobe engages the trailing edge portion of the stack residing above the first panel as the pusher moves the first panel out from under the stack; and a second cam having a second major lobe and a second minor lobe, wherein the second major lobe engages the leading edge portion of the stack residing above the first panel as the pusher moves the first panel out from under the stack.

2. The apparatus of claim 1, wherein the first minor lobe and the second minor lobe engage the stack residing above the first panel and lower the stack.

3. The apparatus of claim 1, wherein the first cam has a first transition zone and the second cam has a second transition zone and the first transition zone and the second transition zone engage the stack residing above: the first panel and then lower the stack.

4. The apparatus of claim 1, wherein the first major lobe has a greater angular profile than the profile of the second major lobe.

5. The apparatus of claim 1, further comprising a timing chain mechanically linking the first cam to the second cam for synchronizing a lifting sequence.

6. The apparatus of claim 1, wherein the first lobe comprises about 180° to about 220° of the circumference of the first cam.

7. The apparatus of claim 1, wherein the second major lobe comprises about 40° to about 80° of the circumference of the second cam.

8. The apparatus of claim 1, wherein the first panel and stack of panels residing above the first panel are housed in a hopper.

9. The apparatus of claim 1, wherein the first cam is mechanically linked using a timing chain to a tenoner transport chain.

10. The apparatus of claim 9, wherein the transport chain sets the first cam in motion to synchronize the engaging of the first major lobe with the trailing edge portion of the stack with the engaging of the pusher with the trailing edge of the first panel.

* * * * *